REMOTELY CONTROLLED POWER PULSE GENERATOR

Filed Feb. 24, 1964

INVENTOR.
LEIGHTON L. MORSE

BY Paul L. Gutcheler [signature]
F. L. Styner [signature]
ATTORNEYS 3,267,415
REMOTELY CONTROLLED POWER PULSE GENERATOR Leighton L. Morse, San Diego, Calif., assignor to the United States of America as represented by the Secretary of the Navy Filed Feb. 24, 1964, Ser. No. 347,094
4 Claims. (Cl. 340—3)

The invention described herein may be manufactured and used by or for the Government of the United States of America for governmental purposes without the payment of any royalties thereon or therefor.

This invention relates to a system for generating short high-powered pulses in a low impedance circuit, such as in a sonar transmitter, and to means for supplying the power and triggering information to the generator through a high impedance circuit.

There is a need for unmanned or remotely controlled sonar transmitters. That is, there is a need for a system for producing relatively high current pulses for a low impedance transducer which is removed a considerable distance from available power.

An object of this invention is to provide an improved sonar system for remotely generating short high-powered pulses in a low impedance circuit.

The object of this invention is attained in a system where there is provided a large storage condenser at the site of the desired power pulses. A remotely located direct power source capable of low-current high-voltage operation is connected to the storage condenser through a pair of conductors which can be quite small. The anode-cathode path of a grid-controlled gaseous discharge device is connected in series between the low impedance load and the condenser. There is provided a unique coupling circuit between the control electrode of the discharge device and said pair of conductors so that a voltage pulse produced by a switch at the power source will initiate a gaseous discharge. The gaseous discharge will suddenly dump the charge of the condenser into the low impedance load. The storage condenser with the unique switching circuit enables the low duty cycle power equipment of the transducer to be connected to the high duty cycle low-power source through small conductors. Thus, the transducer may be located, for example, off shore at the end of a small light-weight cable many miles long. One useful application of this system is recording, at a shore station, the ice floe at a point far off-shore. Alternatively, the power transducer can be placed exteriorly of the hull of a submarine and the low capacity triggering and direct power equipment can be placed inside the hull.

Figure 1:
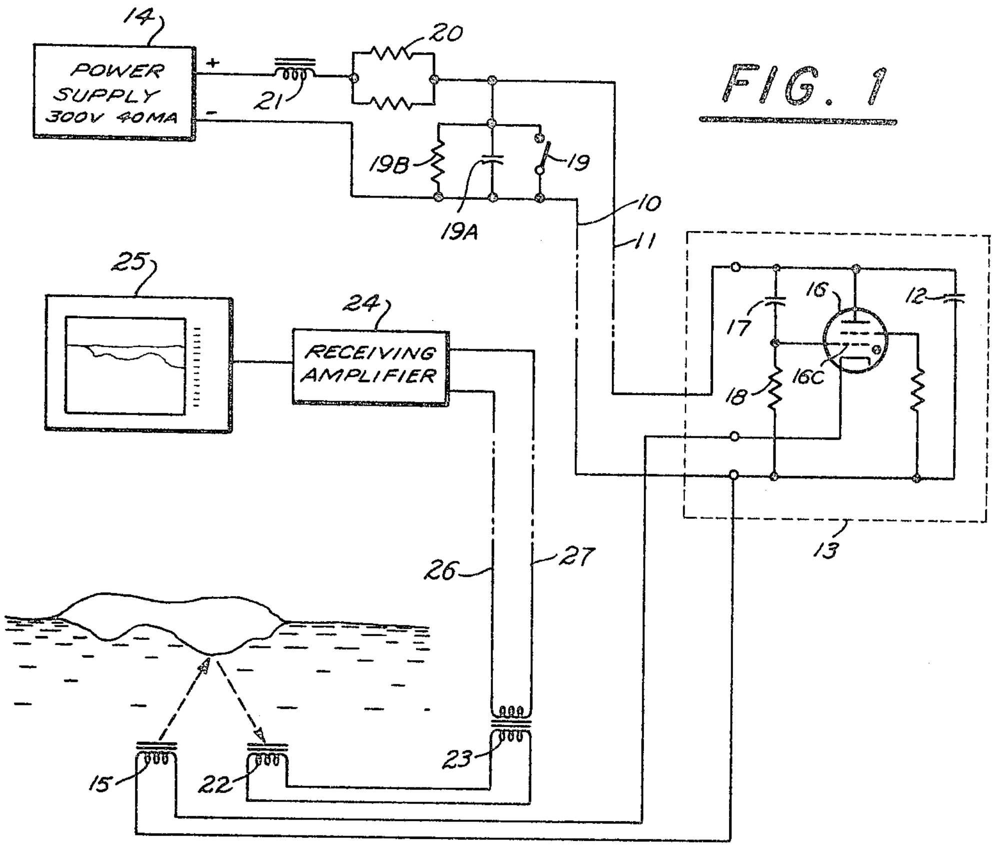
Figure 2:
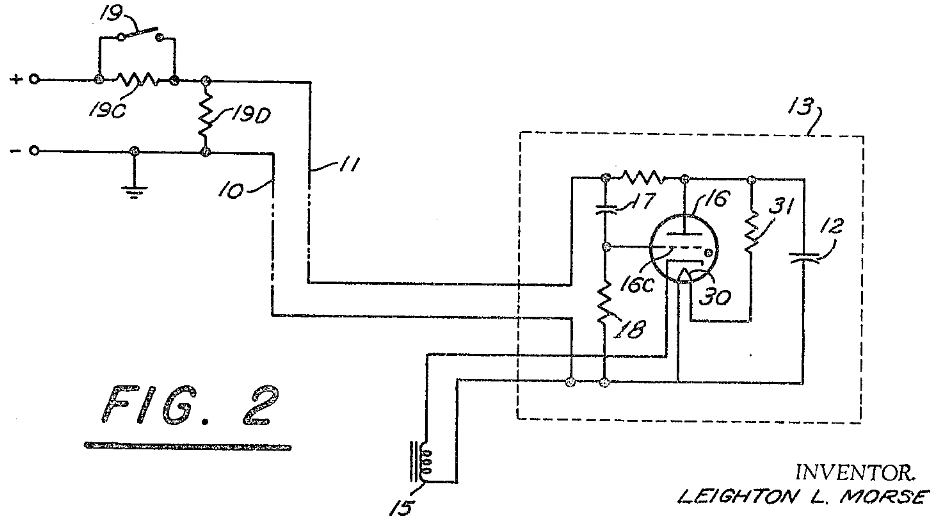

Other objects and features of this invention will become apparent to those skilled in the art by referring to the specific embodiments described in the following specification and shown in the accompanying drawing in which FIG. 1 and FIG. 2 are schematic diagrams of the preferred embodiments of this invention.

It is contemplated that conductors 10 and 11 be of small size, long, of high impedance and that they generally be unsuited for carrying the high current necessary for pulsing a low impedance transducer. Container 13 is pressure-proofed and is adapted for deep submergence operation. Interiorly of the container 13 is a large capacity storage condenser 12. A remote power source 14 charges the condenser 12 through a pair of leads 10 and 11. After the condenser 12 has been charged it is discharged through the anode-cathode path of a gaseous discharge device 16 to a low impedance load 15. The load contemplated here is the low-resistance, low-impedance windings of a magnetostrictive transducer or projector.

The gaseous discharge device may be any one of many commercially obtainable types. The particular characteristic of importance here is that its anode-cathode breakdown potential be relatively high and that the breakdown potential may be lowered by producing an ionized atmosphere with a control electrode. Either a hot or cold cathode may be employed. A cold cathode is shown in FIG. 1. If a hot cathode is employed the heating element would be connected across the lines 10–11 in series with suitable dropping resistors.

The control electrode *16c* is coupled to one of the conductors, 10 or 11, through a coupling condenser 17. Grid leak resistance 18 is connected to the other conductor.

According to this invention the discharge is initiated by applying a pulse of the correct polarity to the control electrode through the appropriate conductor, which is conductor 11 in the specific example shown. A keying switch 19 is adapted to produce the necessary pulse by short circuiting the lines 10 and 11. At the instant of the short circuiting, a negative-going pulse appears on line 11 and through condenser 17 is applied to the control electrode *16c*. The momentary negative voltage applied to the control electrode produces ionization and a glow. The ionized atmosphere, at the line potential between the cathode and anode, produces an arc discharge with the consequent high avalanche current and immediate discharge of the full energy content of the condenser 12 into the load 15.

Alternatively, the keying switch 19 may be placed in series with one of the lines 10 or 11 to produce the necessary igniting pulse on the control electrode. Where switch 19 short-circuits the power supply, current limiting resistances 20 and a choke coil 21 are desirably connected in series with the power supply leads. Arc quenching condenser *19a* and resistance *19b* across the contacts are recommended for protecting the switch contacts.

In operation, the container 13 and transmitting transducer 15 may be anchored to the ocean floor any desired distance off shore for observing the ice cover overhead. Echo signals reflected from the underside of the ice or from the open water surface are picked up by a receiving transducer 22 and, through a matching transformer 23, are fed to an amplifier 24 and hence to recording equipment 25. The minute received signals preferably are transmitted over a pair of conductors 26 and 27 incorporated in the cable with the power supply conductors 10 and 11.

In FIG. 2, the key 19 for pulsing the gas tube is connected across resistance *19c* in series with line 11. A shunt resistance *19d* is connected across the lines. The resistances *19c* and *19d* are so proportioned that when the key is closed, a positive pulse of substantial amplitude traverses the lines and is applied through coupling condenser 17 to the control electrode *16c*. The momentary positive voltage on the grid with respect to the cathode produces a glow discharge which in turn initiates the main arc discharge between anode and cathode. In this mode of operation it might be found desirable to employ a gas tube with a screen grid and to so bias the screen as to establish a threshold gradient condition conducive to the positive-pulse triggering.

In FIG. 2 is also shown the hot cathode type tube mentioned above. Its heating element 30 may be connected directly across the line in series with an appropriate dropping resistor 31.

In one successfully operated prototype, shown in FIG. 1, the power supply was 300 volts direct current, the choke coil 21 was 1.5 henrys, the current limiting resistor 20 was 5000 ohms, the current conductors 10 and 11 were No. 18 gauge stranded wire, the storage condenser 12 was 2 microfarads and the gaseous discharge device was either commercial tube type 631P–1 or OA–5, marketed by Sylvania. In operation the time delay between the closure of switch 19 and the return of the echo signal at the receiving amplifier 24 is a measure of the transit time between the transducers and the reflecting surface of the ice or water surface.

What is claimed is:

1. A remotely controlled power pulse generator comprising:

a current source, a keying switch connected to the output terminals of said source, a remote storage condenser, a pair of conductors connected between said condenser and said source, said conductors having relatively high impedance and low current capacity, a load of relatively low impedance, a grid-controlled gaseous discharge device, the anode-cathode path of said device being connected in series with said load across said condenser, and coupling means between the control grid of said discharge device and one of said conductors and responsive to voltage pulses on said conductor caused by said keying switch for initiating a gaseous discharge to suddenly dissipate the charge of said condenser into said load.

2. In combination in a remotely controlled sonar transmitter, local current source, a remote storage condenser, and a pair of high impedance conductors connected between said condenser and said source said conductors having relatively high impedance and low current capacity, a low impedance load, a grid controlled gaseous discharge device, the anode-cathode path of said device being connected in series with said load across said condenser, the static ignition potential of said path being below the voltage applied across the anode-cathode of said device, and means for initiating discharge in said device comprising means at said power source for applying a pulse of predetermined polarity to said conductors, and capacitive coupling means between one of said conductors and the control electrode of said device to initiate discharge.

3. A remotely controlled sonar system comprising:

a power pulse generator including a storage condenser and a gaseous discharge device with a control electrode, a low impedance projecting transducer, the anode-cathode path of said device being connected in series with said transducer across said condenser, a power supply, a pair of conductors connecting the output of said supply across the terminals of said condenser, means for applying a signal pulse to one of said conductors, a coupling condenser connected between said one of said conductors and said control electrode and responsive to said signal pulse for initiating discharge in said discharge device.

4. The system of claim 3 further comprising a grid leak resistor connected in series with said coupling condenser so that said control electrode is connected to the junction between said coupling condenser and resistor.

References Cited by the Examiner

UNITED STATES PATENTS

| | | | |
|---|---|---|---|
| 2,467,415 | 4/1949 | Woodruff | 328—67 X |
| 2,713,639 | 7/1955 | Blackman | 340—3 X |
| 3,038,328 | 6/1962 | Henry | 73—67.9 |

CHESTER L. JUSTUS, *Primary Examiner.*

R. A. FARLEY, *Assistant Examiner.*